Jan. 2, 1923.
J. W. FRENCH.
ELECTRIC STEP-BY-STEP MOTOR OF THE UNWOUND ARMATURE TYPE.
FILED MAR. 30, 1921.
1,440,729.
2 SHEETS—SHEET 2
FIG: 4.
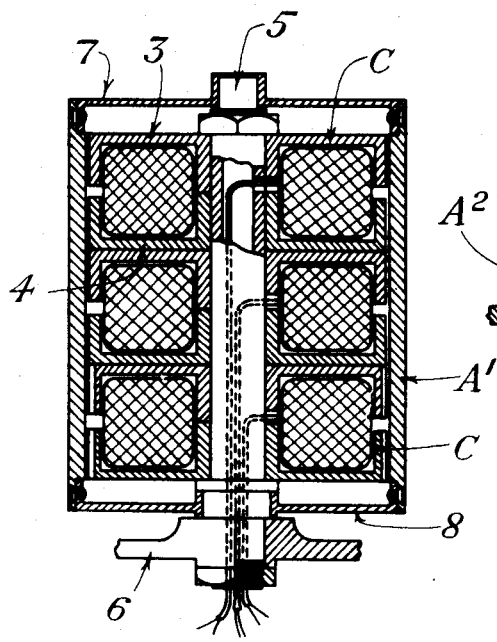
FIG: 6.
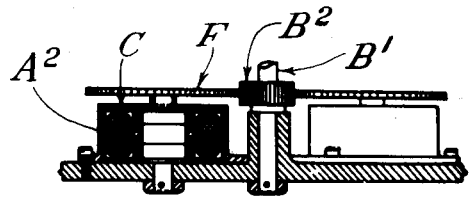
FIG: 5.
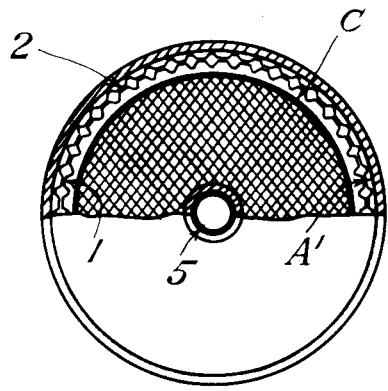
FIG: 7.
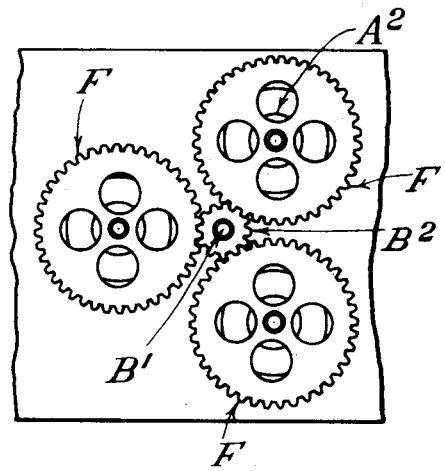
Inventor,
James Weir French
By J. Walter Fowler, Jr.
Attorney Patented Jan. 2, 1923.

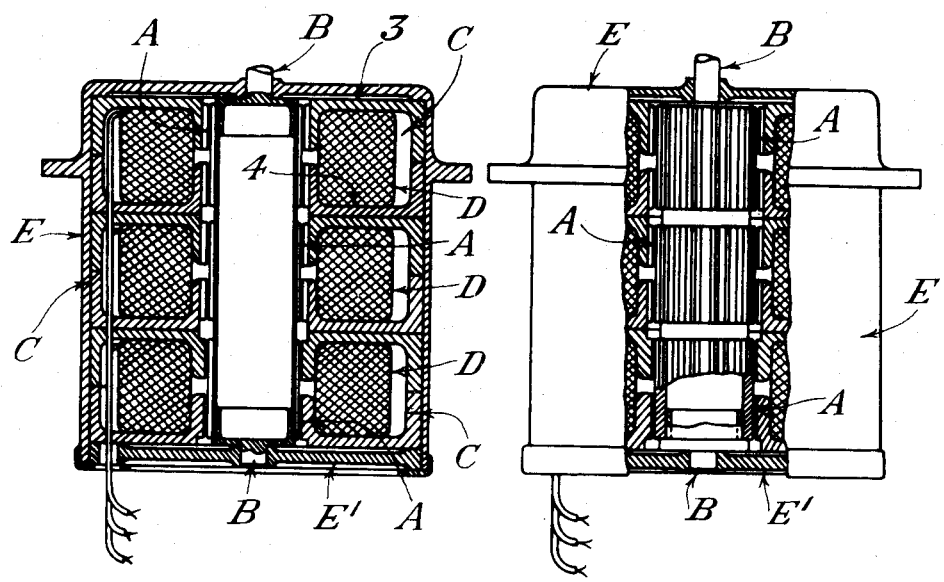

1,440,729

UNITED STATES PATENT OFFICE.

JAMES WEIR FRENCH, OF GLASGOW, SCOTLAND, ASSIGNOR TO BARR AND STROUD, LIMITED, OF GLASGOW, SCOTLAND.

ELECTRIC STEP-BY-STEP MOTOR OF THE UNWOUND-ARMATURE TYPE.

Application filed March 30, 1921. Serial No. 456,945.

*To all whom it may concern:*

Be it known that I, JAMES WEIR FRENCH, a subject of the King of Great Britain and Ireland, and of Caxton Street, Anniesland, Glasgow, Scotland, have invented new and useful Improvements in or Connected with Electric Step-by-Step Motors of the Unwound-Armature Type, of which the following is a specification.

This invention, which refers to electric step-by-step motors of the unwound armature type, consists in the production of an improved type of motor having at least three motor-elements, each motor-element comprising an electro-magnet and an unwound rotary armature each having a circular series of complementary pole faces concentrically arranged and disposed at equal angles apart, and a coil composed of circular windings about the pole faces of the magnet concentric to the axis of the motor-element, in which the armatures of the motor are connected to rotate together, and in which the relative disposition of the pole faces of the motor-elements is such that when the complementary pole faces of one motor-element are in angular conformity those of the other motor-elements are in angular disconformity, but in the process of operation come into conformity successively.

In construction, the armature of a motor-element may be arranged to occupy a position within, or without its electro-magnet, and the armatures and electro-magnets associated to form a motor may be arranged with their pole faces concentric to one and the same axis, or about separate axes one for each motor-element.

In the case of a motor comprising, say, three motor-elements so arranged that the pole faces of the three motor-elements are concentric to one and the same axis, the pole faces of the three armatures may be in alignment parallel with the axis, in which case the complementary pole faces of the respective electro-magnets would be disposed at equal angles about the axis, or the pole faces of the three electro-magnets may be in alignment and the complementary pole faces of the respective armatures be disposed at equal angles apart. These arrangements have constructional advantages but the condition required may be obtained in which the pole faces of both series are each angularly disposed.

Some examples of construction will now be described with reference to the accompanying drawings, in which:—

Figure 1 is an elevation partly in section. Figure 2 is a cross section and Figure 3 is a vertical section illustrating one form of construction.

Figure 4 is a vertical section and Figure 5 is a plan partly in section illustrating another construction.

Figure 6 is a sectional elevation and Figure 7 is a plan illustrating a further construction.

The motors illustrated in each construction comprise the provision of three motor-elements and are intended for the production of rotary step-by-step motion in one or either direction.

In the motor illustrated at Figures 1, 2 and 3, A, A, A are the armatures which are fixed to a shaft B and rotate therewith. In this construction the armatures shown are of hollow cylindrical form and the shaft B is composed of two parts which fit one into each end of the bore. Each armature A is formed with a circular series of pole faces 1, see Figure 2. C, C, C are the electro-magnets each of which is formed with a circular series of pole faces 2, see Figure 2. D, D, D are the coils of the magnets, composed of circular windings concentric to the axis of the shaft B. The electro-magnets C are contained within a stationary casing E and may be fixed against rotation, for instance, by longitudinal key and slot connection with the casing. In the construction illustrated the casing E is open at one end and is formed with a cylindrical interior to receive the electro-magnets C, each of which comprises two parts 3, 4, of annular form, which are applied endwise from opposite sides onto its coil D. The electro-magnets C and the armatures A with the shaft B are adapted to be assembled within the casing by introduction from the open end thereof and retained by a cover $E^1$ which is secured by a ring cap $E^2$ screwed onto the casing E, which in the process of application operates to force the parts endwise together. One bearing for the armature shaft B is formed in the head of the casing the other in the cover $E^1$.

In the construction illustrated at Figures 4 and 5 the electro-magnets C have external pole faces 2, and are fixed upon a stationary shaft 5 which is carried by a fixed support 6. The armatures, designated generally A¹, which as shown may be formed in one part, consist of a cylindrical sleeve having internal pole faces 1. The armatures in this case are fixed to carriers 7 and 8 which are mounted to rotate on journals formed on the shaft 5. Each electro-magnet in this construction also comprises two parts 3, 4, of annular form which are applied endwise onto its coil D.

In the construction illustrated at Figures 6 and 7, the motor-elements are arranged each about a separate axis. In this case the armatures A², which are arranged each within an electro-magnet C, are geared together to rotate a shaft B¹, for which purpose each armature is provided with a gear wheel F arranged to gear with a toothed wheel B² fixed on the shaft B¹.

For operating these motors provision is made whereby the electro-magnets are energized successively in pairs or separately.

The pole faces, which need not be parallel with the axis of rotation, may be of various forms.

In the constructions illustrated the pole faces of the magnets extend from parts 3 and 4 of complete annular form, which, however, need not be circular. Further, the pole faces of the magnets are arranged to extend longitudinally and in each electro-magnet are situated between the two planes, perpendicular to the axis of the pole faces, which contain the ends of its coil.

I claim:—

1. An electric step-by-step motor having at least three motor-elements, each motor-element comprising an electro-magnet and an unwound rotary armature each having a circular series of complementary pole faces concentrically arranged and disposed at equal angles apart and a coil composed of circular windings about the pole faces of the magnet concentric to the axis of the motor-element, in which the armatures of the motor are connected to rotate together, and in which the relative disposition of the pole faces of the motor-elements is such that when the complementary pole faces of one motor-element are in angular conformity those of the other motor-elements are in angular disconformity but in the process of operation come into conformity successively.

2. An electric step-by-step motor having at least three motor-elements, each motor-element comprising an electro-magnet and an unwound rotary armature arranged within its electro-magnet, each having a circular series of complementary pole faces concentrically arranged and disposed at equal angles apart and a coil composed of circular windings about the pole faces of the magnet concentric to the axis of the motor, the pole faces of the magnets extending longitudinally and situated between the two planes, perpendicular to the axis of the pole faces, which contain the ends of its coil, in which the armatures of the motor are connected to rotate together, and in which the relative disposition of the pole faces of the motor-elements is such that when the complementary pole faces of one motor element are in angular conformity those of the other motor-elements are in angular disconformity but in the process of operation come into conformity successively.

3. An electric step-by-step motor having at least three motor-elements, each motor-element comprising an electro-magnet and an unwound rotary armature, each having a circular series of complementary pole faces concentrically arranged and disposed at equal angles apart and a coil composed of circular windings about the pole faces of the magnet concentric to the axis of the motor, the pole faces of the magnets extending longitudinally and situated between the two planes, perpendicular to the axis of the pole faces, which contain the ends of its coil, in which the armatures of the motor are connected to rotate together and arranged with their pole faces concentric to one and the same axis, and in which the relative disposition of the pole faces of the motor-elements is such that when the complementary pole faces of one motor-element are in angular conformity those of the other motor-elements are in angular disconformity but in the process of operation come into conformity successively.

4. An electric step-by-step motor having at least three motor-elements, each motor-element comprising an electro-magnet and an unwound rotary armature arranged within its electro-magnet, each having a circular series of complementary pole faces concentrically arranged and disposed at equal angles apart and a coil composed of circular windings about the pole faces of the magnet concentric to the axis of the motor, the pole faces of the magnets extending longitudinally and situated between the two planes, perpendicular to the axis of the pole faces, which contain the ends of its coil, in which the armatures of the motor are connected to rotate together and arranged with their pole faces concentric to one and the same axis, and in which the relative disposition of the pole faces of the motor-elements is such that when the complementary pole faces of one motor-element are in angular conformity those of the other motor-elements are in angular disconformity but in the process of operation come into conformity successively.

5. An electric step-by-step motor having at least three motor-elements, each motor-element comprising an electro-magnet and an unwound rotary armature, each having a circular series of complementary pole faces concentrically arranged and disposed at equal angles apart and a coil composed of circular windings about the pole faces of the magnet concentric to the axis of the motor, the pole faces of the magnets extending longitudinally and situated between the two planes, perpendicular to the axis of the pole faces, which contain the ends of its coil, in which the armatures of the motor are connected to rotate together and arranged with their pole faces concentric to one and the same axis, and in which the pole faces of the armatures are in alignment and the respective series of pole faces of the electro-magnets are disposed at equal angles apart, and the relative disposition of the pole faces of the motor-elements is such that when the complementary pole faces of one motor-element are in angular conformity those of the other motor-elements are in angular disconformity but in the process of operation come into conformity successively.

6. An electric step-by-step motor having three motor-elements, each motor-element comprising an electro-magnet and an unwound rotary armature each having a circular series of complementary pole faces concentrically arranged and disposed at equal angles apart and a coil composed of circular windings about the pole faces of the magnet concentric to the axis of the motor-element, in which the armatures of the motor are connected to rotate together, the pole faces of the magnets extending from parts of complete annular form, and in which the relative disposition of the pole faces of the motor-elements is such that when the complementary pole faces of one motor-element are in angular conformity those of the other motor-elements are in angular disconformity but in the process of operation come into conformity successively.

7. An electric step-by-step motor having three motor-elements, each motor-element comprising an electro-magnet and an unwound rotary armature arranged within its electro-magnet, each having a circular series of complementary pole faces concentrically arranged and disposed at equal angles apart and a coil composed of circular windings about the pole faces of the magnet concentric to the axis of the motor, in which the armatures of the motor are connected to rotate together, the pole faces of the magnets extending from parts of complete annular form, and in which the relative disposition of the pole faces of the motor-elements is such that when the complementary pole faces of one motor-element are in angular conformity those of the other motor-elements are in angular disconformity but in the process of operation come into conformity successively.

8. An electric step-by-step motor having three motor-elements, each motor-element comprising an electro-magnet and an unwound rotary armature, each having a circular series of complementary pole faces concentrically arranged and disposed at equal angles apart and a coil composed of circular windings about the pole faces of the magnet concentric to the axis of the motor, in which the armatures of the motor are connected to rotate together and arranged with their pole faces concentric to one and the same axis, the pole faces of the magnets extending from parts of complete annular form, and in which the relative disposition of the pole faces of the motor elements is such that when the complementary pole faces of one motor-element are in angular conformity those of the other motor-elements are in angular disconformity but in the process of operation come into conformity successively.

9. An electric step-by-step motor having three motor-elements, each motor-element comprising an electro-magnet and an unwound rotary armature arranged within its electro-magnet, each having a circular series of complementary pole faces concentrically arranged and disposed at equal angles apart, and a coil composed of circular windings about the pole faces of the magnet concentric to the axis of the motor, in which the armatures of the motor are connected to rotate together and arranged with their pole faces concentric to one and the same axis, the pole faces of the magnets extending from parts of complete annular form, and in which the relative disposition of the pole faces of the motor-elements is such that when the complementary pole faces of one motor-element are in angular conformity those of the other motor-elements are in angular disconformity but in the process of operation come into conformity successively.

10. An electric step-by-step motor having three motor-elements, each motor-element comprising an electro-magnet and an unwound rotary armature, each having a circular series of complementary pole faces concentrically arranged and disposed at equal angles apart and a coil composed of circular windings about the pole faces of the magnet concentric to the axis of the motor, in which the armatures of the motor are connected to rotate together and arranged with their pole faces concentric to one and the same axis, the pole faces of the magnets extending from parts of complete annular form, and in which the pole faces of the armatures are in alignment and the respective series of pole faces of the electro-magnets are disposed at equal angles apart, and the relative disposition of the pole faces of the motor-elements is such that when the complementary pole faces of one motor-element are in angular conformity those of the other motor-elements are in angular disconformity but in the process of operation come into conformity successively.

11. An electric step-by-step motor having at least three motor-elements, each motor-element comprising an electro-magnet and an unwound rotary armature, each having a circular series of complementary pole faces concentrically arranged and disposed at equal angles apart and a coil composed of circular windings about the pole faces of the magnet concentric to the axis of the motor, in which the armatures of the motor are connected to rotate together and arranged with their pole faces concentric to one and the same axis, the pole faces of the magnets extending from parts of complete annular form, and in which the relative disposition of the pole faces of the motor-elements is such that when the complementary pole faces of one motor-element are in angular conformity those of the other motor-elements are in angular disconformity but in the process of operation come into conformity successively, in combination with a stationary casing formed with a cylindrical interior to receive the electro-magnets and the armatures, substantially as set forth.

12. An electric step-by-step motor having three motor-elements, each motor-element comprising an electro-magnet and an unwound rotary armature, each having a circular series of complementary pole faces concentrically arranged and disposed at equal angles apart and a coil composed of circular windings about the pole faces of the magnet concentric to the axis of the motor, in which the armatures of the motor are connected to rotate together and arranged with their pole faces concentric to one and the same axis, the pole faces of the magnets extending from parts of complete annular form, and in which the relative disposition of the pole faces of the motor-elements is such that when the complementary pole faces of one motor-element are in angular conformity those of the other motor-elements are in angular disconformity but in the process of operation come into conformity successively, in combination with a stationary casing formed with a cylindrical interior to receive the electro-magnets and the armatures, substantially as set forth.

JAMES WEIR FRENCH.